(12) United States Patent
Dufresne et al.

(10) Patent No.: US 8,598,059 B2
(45) Date of Patent: Dec. 3, 2013

(54) PROCESS FOR SULFURIZING HYDROCARBON TREATMENT CATALYSTS

(75) Inventors: Pierre Dufresne, Valence (FR); Eric Nagy, Charmes (FR); Pauline Galliou, Dunieres sur Eyrieux (FR)

(73) Assignee: Eurecat S.A., La Voulte-sur-Rhone (FR)

( * ) Notice: Subject to any disclaimer, the term of this patent is extended or adjusted under 35 U.S.C. 154(b) by 0 days.

(21) Appl. No.: 12/879,453

(22) Filed: Sep. 10, 2010

(65) Prior Publication Data

US 2011/0098175 A1    Apr. 28, 2011

Related U.S. Application Data

(60) Provisional application No. 61/251,735, filed on Oct. 14, 2009.

(30) Foreign Application Priority Data

Sep. 11, 2009  (FR) ...................................... 09 56241

(51) Int. Cl.
   *B01J 38/48*   (2006.01)
(52) U.S. Cl.
   USPC ........... 502/22; 423/563; 423/573.1; 423/659
(58) Field of Classification Search
   USPC .......................... 502/22; 423/563, 573.1, 659
   See application file for complete search history.

(56) References Cited

U.S. PATENT DOCUMENTS

| | | | |
|---|---|---|---|
| 6,872,678 B2 * | 3/2005 | Eijsbouts | 502/29 |
| 2008/0087577 A1 * | 4/2008 | Cholley et al. | 208/112 |
| 2008/0194892 A1 | 8/2008 | Cholley et al. | |
| 2009/0139898 A1 * | 6/2009 | Long et al. | 208/46 |

FOREIGN PATENT DOCUMENTS

| | | |
|---|---|---|
| EP | 0 707 890 | 4/1996 |
| EP | 0 993 868 | 4/2000 |
| EP | 1 077 085 | 11/2005 |
| EP | 1 634 939 | 3/2006 |
| FR | 2850299 A1 | 7/2004 |
| FR | 2910351 A1 | 6/2008 |
| WO | WO 01/76741 | 10/2001 |
| WO | WO 2006111093 A1 * | 10/2006 |

OTHER PUBLICATIONS

EPO Form 1503, EP, May 26, 2010, Eurecat S.A.

* cited by examiner

*Primary Examiner* — Melvin C Mayes
*Assistant Examiner* — Melissa Stalder
(74) *Attorney, Agent, or Firm* — Saul Ewing LLP; Peter C. Lauro, Esq.

(57) ABSTRACT

The present invention relates to a process for sulfurizing a hydrocarbon treatment catalyst, comprising:

at least a first step of depositing, on the surface of the catalyst, one or more sulfurization auxiliaries of formula (I):

$$\text{HO} - \underset{\underset{O}{\|}}{C} - \underset{R_1}{C} = \underset{R_2}{C} - \underset{\underset{O}{\|}}{C} - \text{OH} \quad (I)$$

and at least a second step, carried out after the first step, of placing the catalyst in contact with a sulfur-containing gaseous mixture containing hydrogen and a sulfur compound.

This process does not comprise the deposit of any carbon sources other than the auxiliary of formula (I).

18 Claims, No Drawings

PROCESS FOR SULFURIZING HYDROCARBON TREATMENT CATALYSTS

CROSS REFERENCE TO RELATED APPLICATIONS

This application claims priority to French application No. 0956241, filed Sep. 11, 2009 and U.S. provisional application Ser. No. 61/251,735, filed Oct. 14, 2009, the entire disclosures of each of which are incorporated herein by reference.

The present invention relates to a process for the sulfurization of catalysts intended for treating hydrocarbons in the field especially of oil refining and petrochemistry.

The present invention also relates to the use of particular sulfurization auxiliaries in order to improve the performances of processes for the gas-phase sulfurization of catalysts intended for treating hydrocarbons.

The hydrocarbon treatment processes performed in petrochemistry refineries and/or units include a certain number of treatments optionally performed in the presence of hydrogen, which are intended to modify the structure of the hydrocarbon molecules and/or to remove from the hydrocarbon fractions undesirable compounds such as especially sulfur-containing, nitrogenous, aromatic and metallic compounds. Non-limiting examples that may be mentioned include hydrocracking or hydroconversion, reforming, isomerization, alkylation, hydrogenation and dehydrogenation processes and "hydrotreatment" processes such as hydrodesulfurization, hydrodenitrogenation, hydrodearomatization, hydrodemetallization and hydrodeoxygenation processes.

These processes make use of specific catalysts, which comprise a porous support made of one or more refractory inorganic oxides, on which are deposited one or more catalytically active metals. These metals usually comprise one or more metals from group VIII of the Periodic Table of the Elements, and/or one or more group VIB metals.

After manufacturing the catalyst, or after regenerating it in the case of an already used catalyst, the metals are in the form of metal oxides, which, per se, are not active.

To enable the catalysts to be active in the various hydrocarbon treatment processes, it is necessary to perform a sulfurization of the catalyst, namely to treat it with sulfur compounds, for the purpose of converting the metal oxides into mixed sulfides, which constitute the active phase of the catalyst.

This sulfurization step is particularly important, since it conditions the activity of the catalyst in its subsequent use.

Many sulfurization processes have been described in the prior art.

In general, the distinguished processes are liquid-phase sulfurization processes, in which the catalyst is treated, in the presence of hydrogen, using a liquid phase (generally a liquid hydrocarbon such as a gas oil) comprising sulfur compounds; and gas-phase sulfurization processes, in which the catalyst is treated with a gaseous mixture containing sulfur (typically in the form of hydrogen sulfide).

Thus, patent application EP 1 634 939 describes a gas-phase sulfurization process using a gas containing hydrogen sulfide ($H_2S$) and hydrogen ($H_2$), with an $H_2S/H_2$ mole ratio of greater than 4 and a partial pressure of $H_2S$ at least equal to 1 kPa.

Numerous means, intended to improve the performance of catalyst sulfurization processes, have been described.

Thus, patent application EP 0 993 868, in the name of the Applicant, describes a process for sulfurizing a hydrocarbon hydroconversion catalyst, in the presence of hydrogen and of at least one sulfur compound. This process is characterized in that the catalyst is also placed in contact with at least one hydrocarbon compound.

Patent application EP 1 077 085, also in the name of the Applicant, describes a sulfurization process which is characterized in that the catalyst is also precarbonized so as to deposit in its pores a carbon compound that is predominantly unleachable.

Moreover, patent application WO 01/76741 describes a process for sulfurizing a catalyst containing at least one hydrogenating metal from groups VI and/or VIII and an organic additive, in which the catalyst is, in a first stage, placed in contact with an organic liquid, and then, in a second stage, placed in contact with hydrogen and a gaseous compound containing sulfur, with the proviso that less than 40% of the sulfur present in the sulfurized catalyst has been provided by the organic liquid.

In continuing its research in the sulfurization of hydrotreatment catalysts, the Applicant has now discovered that it is possible to improve the gas-phase sulfurization processes by depositing, prior to the actual sulfurization step, a particular sulfurization auxiliary on the surface of the catalyst. This discovery forms the basis of the present invention.

Thus, one subject of the present invention is a process for sulfurizing a hydrocarbon treatment catalyst, comprising:
   at least a first step of depositing, on the surface of the catalyst, one or more sulfurization auxiliaries of formula (I):

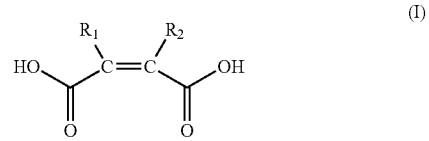

in which the groups $R_1$ and $R_2$, which may be identical or different, denote a hydrogen atom or a linear or branched, saturated or unsaturated hydrocarbon-based radical, comprising from 1 to 30 carbon atoms, not containing any aromatic ring(s), and which may optionally contain one or more heteroatoms chosen from oxygen, nitrogen or sulfur atoms; and
   at least a second step of placing the catalyst in contact with a sulfur-containing gaseous mixture containing hydrogen and a sulfur compound, this second step being carried out after the first step,
   the process not comprising any deposit, on the surface of the catalyst, of carbon sources other than the sulfurization auxiliary of formula (I).

The sulfurization process according to the invention gives the catalyst an excellent level of activity, higher than that observed with certain processes of the prior art. In particular, the Applicant has found that the presence of the sulfurization auxiliary of formula (I) at the surface of the sulfurized catalyst improves the activity of the catalyst.

Furthermore, the Applicant has also found that the sulfurization auxiliary of formula (I) facilitates the binding of sulfur to the catalyst. In particular, the actual sulfurization step, by placing the catalyst in contact with the sulfur-containing gaseous mixture, may be performed at a lower temperature than that which is generally applied in the prior art.

Reducing the temperature at which the sulfurization step is performed offers many advantages. Firstly, it allows savings in energy, and thus reduces the operating costs of the process.

Secondly, lowering the temperature of the sulfurization step makes it possible to limit during this step any potential decomposition of the sulfurization auxiliary of formula (I), and of any other compound that may be present at the surface of the catalyst. Thus, a larger amount of the said auxiliary is preserved at the surface of the catalyst after the process according to the invention, which limits the amounts to be impregnated.

Finally, the Applicant has found that, when compared with other organic compounds used in prior art sulfurization processes, the use of the particular desulfurization additive of formula (I) makes it possible to substantially reduce, or even to eliminate, the evolution of carbon monoxide.

Specifically, certain organic compounds, once deposited on the catalyst, may evolve carbon monoxide (CO), which is a particularly toxic and pollutant gas.

This phenomenon is particularly undesirable in a two-step process such as that of the invention, in which the catalyst is liable to undergo handling (for example to be moved from one reactor to another) between the two steps. Specifically, in this case, the persons in charge of handling the catalyst are particularly exposed to potential evolution of carbon monoxide.

However, the Applicant has observed that, surprisingly, the process according to the invention makes it possible to substantially reduce, or even to eliminate, the evolution of carbon monoxide observed with certain prior art processes using organic additives.

The process according to the present invention includes a first step in which one or more sulfurization auxiliaries of formula (I) are deposited on the surface of the catalyst.

According to a preferred embodiment, in formula (I), the groups $R_1$ and $R_2$, which may be identical or different, denote a hydrogen atom or a linear or branched, saturated or unsaturated hydrocarbon-based radical, comprising from 1 to 8 carbon atoms, not containing any aromatic ring(s), and which may optionally contain one or more heteroatoms chosen from oxygen, nitrogen and sulfur atoms.

More preferably, in formula (I), the groups $R_1$ and $R_2$, which may be identical or different, denote a hydrogen atom or a linear or branched, saturated or unsaturated hydrocarbon-based radical, comprising from 1 to 4 carbon atoms, and which may be substituted with one or more groups —OH, —OR, —SH, —SR, —NH$_2$, —NHR or —NRR', with R and R' denoting alkyl groups comprising from 1 to 4 carbon atoms and preferably 1 or 2 carbon atoms.

Even more preferably, at least one of the two groups $R_1$ and $R_2$ denotes a hydrogen atom.

According to one particularly preferred embodiment of the invention, $R_1$ and $R_2$ both denote a hydrogen atom.

The sulfurization auxiliary of formula (I) is deposited on the surface of the catalyst by placing the catalyst in contact with the said auxiliary. This may be performed in several ways, for example by placing the catalyst in contact with the pure sulfurization auxiliary (especially in liquid or gaseous form), or with a composition containing the sulfurization auxiliary in a carrier fluid that may be liquid, gaseous or supercritical. Preferably, the sulfurization auxiliary of formula (I) is deposited by placing the catalyst in contact with a solution or suspension of the said auxiliary in a carrier liquid.

Thus, the process is particularly preferably performed by impregnating the catalyst using a solution or dispersion of the sulfurization auxiliary in a suitable aqueous and/or organic liquid.

According to one particularly advantageous embodiment of the invention, the sulfurization auxiliary(ies) of formula (I) are deposited on the catalyst by impregnation with one or more aqueous solutions of these auxiliaries.

Preferably, the aqueous solution(s) employed do not comprise any organic cosolvent.

The process may be performed by dry impregnation of the catalyst (i.e. using a solution whose volume is less than or equal to the pore volume of the catalyst), by impregnation of the catalyst in the presence of an excess of solution, or by dipping the catalyst in an excess of solution.

This placing of the catalyst in contact with the sulfurization auxiliary may be instantaneous or may last up to 20 hours. Preferably, this placing in contact lasts about 2 hours and preferably about 1 hour. It may be performed at a pressure ranging from atmospheric pressure to 5 bar, preferably at atmospheric pressure, and may be performed at a preferential temperature ranging from room temperature to 100° C.

If solvent remains, it is then removed, for example by heating to evaporate it, or by suction, or by drying using a stream of gas optionally in the presence of heating. In any case, the removal of any residual solvent must be performed so as to conserve all, or at least a substantial part, of the sulfurization auxiliary deposited on the surface of the catalyst, and to prevent it from decomposing.

In general, the first step must be performed under conditions allowing the deposition on the surface of the catalyst of a sufficient amount of sulfurization auxiliary of formula (I), so as to obtain the desired gain in activity.

Preferably, after the first step, the total amount of sulfurization auxiliary(ies) of formula (I) deposited on the surface of the catalyst, expressed as the ratio of the molar amount of compound(s) of formula (I) to the total molar amount of catalytically active metals, is at least 0.01 mol of compound(s) of formula (I) per mole of catalytically active metals. Preferably, this amount is between 0.01 and 10 mol of compound(s) of formula (I) per mole of catalytically active metals, more preferentially between 0.05 and 5 mol and even more preferably between 0.1 and 1.5 mol.

For example, when the catalyst comprises, as catalytically active metals, metals from groups VIII and VIB, the total amount of sulfurization auxiliary(ies) of formula (I) deposited on the surface of the catalyst after the first step is preferably at least 0.01 mol of compound(s) of formula (I) per mole of metals of groups VIII and VIB. Preferably, this amount is between 0.01 and 10 mol of compound(s) of formula (I) per mole of metals of groups VIII and VIB, more preferentially between 0.05 and 5 mol and even more preferably between 0.1 and 1.5 mol.

The process according to the present invention also comprises at least a second step, during which the catalyst is placed in contact with a sulfur-containing gaseous mixture, containing hydrogen and a sulfur compound.

Advantageously, the sulfur compound is hydrogen sulfide ($H_2S$) or a compound capable of releasing hydrogen sulfide by hydrogenolysis under the operating conditions of the second step. Among the compounds that may be used for this purpose, mention is made, for example, of elemental sulfur, $CS_2$, and organic sulfur compounds, such as mercaptans, sulfides, disulfides, polysulfides, thiols, thiophenes or sulfoxides.

This sulfur compound may be introduced concomitantly with the hydrogen, or deposited beforehand on the catalyst.

Thus, according to a first embodiment, the catalyst is simultaneously placed in contact with hydrogen and the sulfur compound, by placing the catalyst in contact with a pre-constituted gaseous mixture, containing hydrogen and the sulfur compound.

Preferably, this gaseous mixture contains hydrogen and hydrogen sulfide. The process may be performed, for example, in the manner described in patent application EP 1 634 939.

According to a second embodiment, the catalyst is, in a first stage, placed in contact with the sulfur compound, for example by depositing the latter on the surface of the catalyst, and then, in a second stage, the catalyst is placed in contact with a gas containing hydrogen, under conditions such that the sulfur compound decomposes and gives rise to hydrogen sulfide. The sulfur-containing gaseous mixture is thus obtained.

In this embodiment, the sulfur compound is preferably chosen from elemental sulfur and organic sulfur compounds, in particular mercaptans, sulfides, disulfides, polysulfides and sulfoxides.

The sulfur compound may be deposited on the catalyst in its native form, in liquid or gaseous form. It may also be deposited as a solution or suspension in a gaseous or liquid carrier fluid. The process may thus be performed by impregnating the catalyst using a solvent containing the said sulfur compound, followed by optional drying to evaporate off the solvent. The process may be performed, for example, in the manner described in patent application EP 0 707 890.

The preferred embodiment of the second step is that in which the catalyst is placed in contact with a preconstituted sulfur-containing gaseous mixture, containing hydrogen and hydrogen sulfide.

Whatever the particular embodiment of the second step, the amount of sulfur compound employed is such that the hydrogen sulfide represents from 5% to 70% by volume of the hydrogen sulfide+hydrogen mixture, and preferably from 10% to 60% by volume.

The sulfur-containing gaseous mixture may, in addition to hydrogen and the sulfur compound, also comprise one or more other gases, especially such as inert dilution gases, for example nitrogen. Such additional gases may represent, for example, from 5% to 80% by volume of the said gaseous mixture.

Whether the sulfur compound is introduced directly with the hydrogen or generated from a compound deposited beforehand on the catalyst, the actual placing in contact of the catalyst with the sulfur-containing gaseous mixture is performed at a temperature ranging from 150 to 500° C. and preferably from 200 to 350° C.

Preferably, the temperature varies over time. Thus, the process may be performed in at least two steps, a first step of gradual temperature increase, followed by a second steady-state step at a temperature ranging from 200 to 350° C.

According to one particularly preferred and advantageous embodiment of the invention, the actual placing in contact of the catalyst with the sulfur-containing gaseous mixture is performed at a temperature below 300° C., more preferentially below 275° C., and even more preferentially below 250° C.

Specifically, by virtue of the presence of the sulfurization auxiliary of formula (I) on the surface of the catalyst, the treatment of the catalyst with the sulfur-containing gaseous mixture is more efficient, and may be performed at a lower temperature than that usually applied in the prior art, which is generally at least 300° C.

The pressure is generally between atmospheric pressure and 100 bar. Preferably, the placing in contact of the catalyst with the sulfur-containing gaseous mixture is performed at atmospheric pressure.

The said second step may be performed in a fixed bed or in a mobile bed, for example in a fluidized or boiling bed, or in a rotary oven. In the case of a mobile bed, the sulfur-containing gaseous mixture may circulate co-currentwise or counter-currentwise relative to the bed of catalyst, preferably counter-currentwise.

The amount of sulfur incorporated into the catalyst during the said second step depends on the amount of active metals present on its surface. Preferably, the amount of sulfur incorporated represents from 50% to 200%, preferably 80% to 120% and more preferably from 90% to 110% of the stoichiometric amount of sulfur required in order for the active metals to be totally in the form of metal sulfides.

For example, in the case of the catalyst whose active metals are cobalt and molybdenum, the sulfide forms corresponding to a stoichiometry of 100% may be likened, respectively, to CoS and $MoS_2$.

In addition, the process according to the invention is preferably performed under conditions such that the sulfurized catalyst obtained via the said process contains at least 1% by weight of carbon originating from the sulfurization auxiliary of formula (I), relative to the total weight of the catalyst in oxide form. Preferably, this content is at least 1.5% by weight.

Measurement of the content of carbon originating from the auxiliary of formula (I) may be performed by measuring the carbon content of the sulfurized catalyst, correcting it for the loss on ignition at 500° C. (measurement detailed hereinbelow) to express it relative to the weight of oxide catalyst, and subtracting from this content the possible carbon content of the initial catalyst before treatment via the process according to the invention.

In the process according to the present invention, the said second step is performed after the first step. It may be performed directly after the first step, or may be separated therefrom by one or more intermediate steps.

The sulfurization process according to the invention may thus, besides the two steps described above, optionally comprise one or more additional steps, which may be performed before and/or after the said first and second steps, or alternatively may be intercalated between these two steps.

Thus, the process according to the invention may also comprise, after the said first step, a step of drying the catalyst, which may be performed at a temperature ranging from 80° C. to 350° C. and preferably from 100° C. to 200° C., in the open air or in the presence of a gaseous stream of air, of inert gas such as nitrogen, or of any other suitable gas.

In addition, the said second step is generally followed by a cooling step, during which the catalyst is cooled to room temperature, or to a temperature close to room temperature. This cooling, generally performed gradually, may be carried out in the presence of the sulfur-containing gaseous mixture, or of any other suitable gas, for example hydrogen, an inert gas such as nitrogen, oxygen, or a mixture of such gases, or of various gaseous mixtures employed successively.

Thus, a first cooling phase with sulfur-containing gaseous mixture, followed by a second cooling phase under inert gas, for example nitrogen, may be performed.

According to a preferred embodiment of the invention, the process also includes, after the said second step, a step of passivation of the catalyst, which is preferably oxidative passivation.

This oxidative passivation consists in placing the catalyst in contact with oxygen or a gaseous mixture containing oxygen. A gaseous mixture containing less than 30% oxygen is preferably employed. This gaseous mixture may especially be air. The catalyst may be placed in contact with the gas containing oxygen in several stages, with gradual increase of the oxygen content over time.

The passivation step is preferably performed at a temperature of less than or equal to 150° C., for a duration generally of less than 24 hours. It may especially be performed simultaneously with the step of cooling of the catalyst performed after the second step.

In the case of a sulfurization process performed ex situ, passivation especially has the advantage of reducing the pyrophoric tendency of the sulfide phases present on the surface of the catalyst, and thus of enabling its easy transfer or storage, for example in metal drums or other types of containers.

The sulfurization process according to the present invention does not comprise any deposit, on the surface of the catalyst, of carbon sources other than the sulfurization auxiliary of formula (I). In particular, the process according to the invention does not comprise any deposit of hydrocarbons other than the sulfurization auxiliary of formula (I).

The process according to the present invention makes it possible to sulfurize any catalyst intended for treating hydrocarbons, in the fields of refinery and petrochemistry.

These catalysts comprise at least one active metal especially such as a hydrogenating metal, deposited on a support made of one or more refractory mineral oxides.

The term "hydrogenating metal" denotes a metal from groups VIII and VIB of the Periodic Table of the Elements.

Preferably, the catalysts treated by means of the process according to the invention are catalysts containing at least one metal from group VIII of the Periodic Table of the Elements, for instance cobalt, nickel, iron, platinum or palladium, combined with at least one metal from group VIB, for instance molybdenum, tungsten or chromium. The content of the group VIII metal(s) is generally between 0.1% and 10% by weight relative to the total weight of the catalyst, and the content of the group VIB metal(s) is generally between 1% and 20% by weight relative to the total weight of the catalyst.

The hydrogenating metal(s) are deposited on a support made of one or more refractory mineral oxides such as especially aluminas, silicas, silica-aluminas, zeolites, zirconias, titanium and boron oxides, and mixtures of such oxides.

The process according to the invention is most particularly suitable for the sulfurization of hydrotreatment catalysts comprising active metals deposited on a non-zeolite support chosen from aluminas, silicas and silica-aluminas. More preferentially, the said non-zeolite support contains at least 30% by weight and preferably at least 50% by weight of alumina.

The process according to the invention is particularly suitable for sulfurizing catalysts containing the metallic combinations CoMo, NiMo, NiW, NiCoMo, deposited on alumina-based supports.

The catalysts treated by means of the process according to the invention may contain, besides the hydrogenating metal(s), any suitable additional ingredient. They may thus contain, for example, in a non-limiting manner, one or more halogen, boron or phosphorus compounds, one or more elements chosen from those of groups IIIB, IVB, VB of the Periodic Table of the Elements.

The process according to the present invention is most particularly suitable for the sulfurization of catalysts not containing any organic additive. Thus, it is most particularly suitable for the sulfurization of catalysts for which the difference between the loss on ignition at 500° C. and the loss on ignition at 150° C. is less than or equal to 2% by weight, relative to the initial weight of the catalyst.

As is well known to those skilled in the art, the term "loss on ignition" (or LOI) denotes the loss of mass resulting from the heating of a material, due to the loss of volatile materials. A catalyst containing organic materials such as an organic additive has a significant loss on ignition at 500° C., resulting from the decomposition of these organic materials. In addition, due to their large specific surface area and their hygroscopic nature, the catalysts may absorb an appreciable amount of water originating, inter alia, from the moisture of the air, which is characterized by a loss on ignition at 150° C. that may range from 5% to 10% by weight. Thus, to determine whether or not a catalyst contains an organic additive, the difference between the loss on ignition at 500° C. and the loss on ignition at 150° C. should be considered.

Hydrocarbon-treatment catalysts are generally in the form of small solid particles such as beads, more or less cylindrical particles or extrudates. They have a specific surface area, measured by the BET method, generally of between 100 and 300 $m^2/g$, a pore volume, determined by adsorption of nitrogen; ranging from 0.25 to 1 ml/g, and a mean pore diameter, determined by adsorption of nitrogen, ranging from 7 to 20 nm.

The process according to the invention is suitable for the sulfurization both of new catalysts and of spent catalysts that have been regenerated beforehand.

Once treated by means of the process according to the present invention, the catalyst is ready for use, and may be advantageously employed directly in the hydrocarbon treatment process for which it is intended.

It is also possible to perform a second sulfurization treatment of the catalyst, carried out especially in situ, immediately before employing the catalyst. It may in particular be a sulfurization treatment performed in the presence of hydrogen by passing through the catalyst a liquid phase containing sulfur, typically a sulfur-containing hydrocarbon fraction and/or a fraction enriched in sulfur-containing hydrocarbons, for instance a distillate optionally supplemented with dimethyl disulfide.

Thus, the process according to the invention may be employed as a presulfurization process, in order to precondition the catalyst, to reduce the intensity and duration of the final sulfurization treatment performed in situ, and thus to save time, and to increase the efficacy of the hydrocarbon treatment process.

The catalysts obtained by means of the process according to the invention may be employed in any industrial process using a sulfur-containing catalyst. They are more particularly intended for processes for treating hydrocarbons such as petroleum fractions, hydrocarbons produced from natural gas, coal, and hydrocarbons of plant origin.

Non-limiting examples that are mentioned include hydrocracking or hydroconversion, reforming, isomerization, alkylation, hydrogenation and dehydrogenation processes and "hydrotreatment" processes such as hydrodesulfurization, hydrodenitrogenation, hydrodearomatization, hydrodemetallization and hydrodeoxygenation processes.

The process according to the present invention is most particularly suitable for the sulfurization of catalysts intended for processes for the hydrotreatment of petroleum fractions, and in particular the hydrodesulfurization process.

A subject of the present invention is also the use of the sulfurization auxiliaries of formula (I) as described above, to improve the performance of the processes for sulfurizing catalysts intended for treating hydrocarbons. In particular, by virtue of the use of this particular auxiliary during the sulfurization process, a catalyst whose activity is improved is obtained.

Finally, a subject of the present invention is the use of a sulfurization auxiliary of formula (I) as described above in processes for sulfurizing catalysts comprising one or more metal oxides, so as to improve the stoichiometry of the sulfurization of the metal oxide(s).

It should be noted that the sulfurization auxiliary of formula (I) may be used in any sulfurization process, for example in liquid phase or in gas phase. This use is particularly beneficial in the case of gas-phase sulfurization processes.

The examples that follow are given purely as illustrations of the present invention.

EXAMPLES

Comparative Example 1

This example was performed using a conventional hydrotreatment catalyst C1, containing 23.1% by weight of $MoO_3$ and 4.2% by weight of CoO supported on gamma-alumina. It contains less than 0.1% by weight of carbon.

This catalyst has a difference between the loss on ignition measured at 500° C. and the loss on ignition measured at 150° C. of 1.5% by weight.

The loss on ignition was determined as follows: a known initial mass of the catalyst ($m_i$) is introduced into an oven at a given temperature T for 2 hours. The catalyst is then removed from the oven, placed in a desiccator to cool it without it taking up moisture again, and then weighed. The final mass $m_f$ is thus obtained. The loss on ignition is then calculated in the following manner:

$$\text{Loss on ignition (at } T° \text{ C.)} = \frac{m_i - m_f}{m_i} * 100$$

Table 1 below summarizes the characteristics of the starting catalyst C1.

TABLE 1

| | |
|---|---|
| $MoO_3$ content (weight %) | 23.1 |
| CoO content (weight %) | 4.2 |
| Carbon content (weight %) | <0.1 |
| Loss on ignition at 500° C. (weight %) | 3.5 |
| Loss on ignition at 150° C. (weight %) | 2 |
| Loss on ignition at 500° C. – Loss on ignition at 150° C. | 1.5 |

This catalyst C1 was sulfurized at atmospheric pressure with an $H_2S/H_2$ gaseous mixture, with a partial pressure of $H_2S$ of 0.4 and an hourly space velocity (HSV) of gas of 300 $h^{-1}$. The temperature ramp is 5° C./minute up to 320° C., with a steady stage of 2 hours at this temperature. The sulfurized sample S1 was thus obtained. The analyses performed on the sulfurized catalyst S1 allowed the following results to be obtained:

TABLE 2

| | |
|---|---|
| Loss on ignition at 500° C. (weight %) | 4.8 |
| Carbon content relative to the weight of oxide catalyst (weight %) | <0.1 |
| Sulfur content relative to the weight of oxide catalyst (weight %) | 10.4 |
| Stoichiometry S (%) | 86 |

The stoichiometry is the ratio of the measured sulfur content (relative to the weight of oxide catalyst) to the calculated sulfur content, corresponding to complete sulfurization of the metal oxides (considering that the sulfide forms CoS et $MoS_2$ are formed).

Comparative Example 2

This example was performed using the same conventional hydrotreatment catalyst C1, described in Example 1.

This catalyst C1 was sulfurized at atmospheric pressure with an $H_2S/H_2$ gaseous mixture, with a partial pressure of $H_2S$ of 0.4 and an $HSV_{gas}$ of 300 $h^{-1}$. The temperature ramp is 5° C./minute up to 225° C., with a steady stage of 2 hours at this temperature. The sulfurized sample S2 was thus obtained.

The analyses performed on this sulfurized catalyst S2 allowed the following results to be obtained:

TABLE 3

| | |
|---|---|
| Loss on ignition at 500° C. (weight %) | 3.1 |
| Carbon content relative to the weight of oxide catalyst (weight %) | <0.1 |
| Sulfur content relative to the weight of oxide catalyst (weight %) | 8.2 |
| Stoichiometry S (%) | 68 |

Comparative Example 3

This example was performed using the same conventional hydrotreatment catalyst C1, described in Example 1.

100 g of catalyst C1 were impregnated with 10 g of a hydrocarbon (base mineral oil of the type 150 Neutral, with a mass per unit volume of 0.87 g/cm$^3$ and a viscosity of 121 mm$^2$/s) to give the catalyst A1.

This catalyst A1 was sulfurized at atmospheric pressure with an $H_2S/H_2$ gaseous mixture, with a partial pressure of $H_2S$ of 0.4 and an $HSV_{gas}$ of 300 $h^{-1}$. The temperature ramp is 5° C./minute up to 225° C., with a steady stage of 2 hours at this temperature.

The sulfurized sample S3 was thus obtained. The analyses performed on the sulfurized catalyst S3 allowed the following results to be obtained:

TABLE 4

| | |
|---|---|
| Loss on ignition at 500° C. (weight %) | 12.8 |
| Carbon content relative to the weight of oxide catalyst (weight %) | 8.3 |
| Sulfur content relative to the weight of oxide catalyst (weight %) | 8.0 |
| Stoichiometry S (%) | 66 |

Example 4

According to the Invention

This example was performed using the same conventional hydrotreatment catalyst C1, described in Example 1.

100 g of catalyst C1 were impregnated to saturation of the pore volume at room temperature with a solution consisting of 10 g of maleic acid and 35 g of demineralized water. After impregnation, the sample was dried under nitrogen in an oven at 140° C., to obtain the catalyst A2.

This catalyst A2 was sulfurized at atmospheric pressure with an $H_2S/H_2$ gaseous mixture, with a partial pressure of $H_2S$ of 0.4 and an $HSV_{gas}$ of 300 $h^{-1}$. The temperature ramp is 5° C./minute up to 320° C., with a steady stage of 2 hours at this temperature. The sulfurized sample S4 was thus obtained. The analyses performed on this sulfurized catalyst S4 allowed the following results to be obtained:

TABLE 5

| | |
|---|---|
| Loss on ignition at 500° C. (weight %) | 8.4 |
| Carbon content relative to the weight of oxide catalyst (weight %) | 2.1 |

TABLE 5-continued

| Sulfur content relative to the weight of oxide catalyst (weight %) | 11.8 |
| Stoichiometry S (%) | 98 |

Example 5

According to the Invention

Catalyst A2 described in Example 4 was sulfurized at atmospheric pressure with an $H_2S/H_2$ gaseous mixture, with a partial pressure of $H_2S$ of 0.4 and an $HSV_{gas}$ of 300 $h^{-1}$. The temperature ramp is 5° C./minute up to 225° C., with a steady stage of 2 hours at this temperature.

The sulfurized sample S5 was thus obtained. The analyses performed on this catalyst S5 allowed the following results to be obtained:

TABLE 6

| Loss on ignition at 500° C. (weight %) | 11.0 |
| Carbon content relative to the weight of oxide catalyst (weight %) | 3.5 |
| Sulfur content relative to the weight of oxide catalyst (weight %) | 11.0 |
| Stoichiometry S (%) | 91 |

Example 6

Hydrodesulfurization Performance of the Catalysts of Examples 1 to 5

The hydrocarbon hydrodesulfurization activity of each sulfurized catalyst S1, S2, S3, S4 and S5 was then evaluated, by means of a pilot test.

The charge used is a "straight run" gas oil, which has the following characteristics:

| Sulfur content (ppm by weight) | 12 200 |
| Nitrogen content (ppm by weight) | 94 |
| Density (g/mL) | 0.837 |

The volume of catalyst employed for the test was 10 mL.

After a wetting period of 3 hours at room temperature with the gas oil, the temperature rise is performed with a ramp of 40° C./hour up to the test temperature, with the gas oil at an hourly space velocity of 2 $h^{-1}$, with an $H_2$/gas oil ratio of 300 (NL/h)/(L/h) and a total pressure of 3 MPa.

The test conditions are then as follows: pressure of 3 MPa, $H_2$/gas oil ratio of 300, HSV=2 $h^{-1}$; the test was performed, for each sample, at a unit temperature of 340, 345 and 350° C.

The sulfur content of the charge is measured at the unit outlet using an analyser by UV fluorescence. The results obtained are given in Table 7 below.

TABLE 7

| Catalyst | Sulfurization auxiliary | Sulfurization temperature (° C.) | S content at the unit outlet (in ppm) | | |
| --- | --- | --- | --- | --- | --- |
| | | | at 340° C. | at 345° C. | at 350° C. |
| S1 | none | 320 | 154 | 78 | 38 |
| S2 | none | 225 | 265 | 151 | 70 |

TABLE 7-continued

| Catalyst | Sulfurization auxiliary | Sulfurization temperature (° C.) | S content at the unit outlet (in ppm) | | |
| --- | --- | --- | --- | --- | --- |
| | | | at 340° C. | at 345° C. | at 350° C. |
| S3 | 150N oil | 225 | 238 | 133 | 62 |
| S4 | maleic acid | 320 | 104 | 55 | 26 |
| S5 | maleic acid | 225 | 135 | 65 | 29 |

The above results demonstrate that catalysts S4 and S5, sulfurized by means of the process according to the invention, have hydrodesulfurization activity that is very markedly improved compared with the catalysts S1, S2 and S3 sulfurized by means of processes according to the prior art. This gain in activity is observed also when the temperature of the actual sulfurization (treatment using the sulfur-containing gaseous mixture) is substantially lowered, from 320° C. to 225° C.

Moreover, the analyses performed on the samples of catalysts show that the use of the sulfurization auxiliary according to the invention makes it possible to substantially improve the sulfurization stoichiometry of the metal oxides present at the surface of the catalyst.

Incorporation by Reference

The contents of all references, patents, pending patent applications and published patents, cited throughout this application are hereby expressly incorporated by reference.

Equivalents

Those skilled in the art will recognize, or be able to ascertain using no more than routine experimentation, many equivalents to the specific embodiments of the invention described herein. Such equivalents are intended to be encompassed by the following claims.

The invention claimed is:

1. A process for sulfurizing a hydrocarbon treatment catalyst, comprising:
    a first step of depositing, on the surface of the catalyst, one or more sulfurization auxiliaries of formula (I):

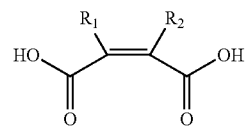

in which the groups $R_1$ and $R_2$, which may be identical or different, denote a hydrogen atom or a linear or branched, saturated or unsaturated hydrocarbon-based radical, comprising from 1 to 30 carbon atoms, and not containing any aromatic rings(s), and which optionally contain one or more heteroatoms chosen from oxygen, nitrogen or sulfur atoms; and,
    a second step of placing the catalyst in contact with a sulfur-containing gaseous mixture containing hydrogen and a sulfur compound, wherein this second step is carried out after the first step,
    the process does not use any deposit, on the surface of the catalyst, of carbon sources other than the sulfurization auxiliary of formula (I).

2. The process according to claim 1, characterized in that in formula (I), the groups $R_1$ and $R_2$, which may be identical or different, denote a hydrogen atom or a linear or branched, saturated or unsaturated hydrocarbon-based radical, comprising from 1 to 8 carbon atoms, and not containing any aromatic ring(s), and which may optionally contain one or more heteroatoms chosen from oxygen, nitrogen and sulfur atoms.

3. The process according to claim 1, characterized in that in formula (I), the groups $R_1$ and $R_2$, which may be identical or different, denote a hydrogen atom or a linear or branched, saturated or unsaturated hydrocarbon-based radical, comprising from 1 to 4 carbon atoms, and which may be substituted with one or more groups —OH, —OR, —SH, —SR, —NH$_2$, —NHR or —NRR', with R and R' denoting alkyl groups comprising from 1 to 4 carbon atoms.

4. The process of claim 3, wherein R and R' denote alkyl groups comprising 1 carbon atom.

5. The process of claim 3, wherein R and R' denote alkyl groups comprising 2 carbon atoms.

6. The process according to claim 1, characterized in that at least one of the two groups $R_1$ and $R_2$ denote a hydrogen atom.

7. The process according to claim 6, characterized in that $R_1$ and $R_2$ both denote a hydrogen atom.

8. The process according to claim 1, characterized in that the sulfurization auxiliary(ies) of formula (I) are deposited on the catalyst by impregnation with one or more aqueous solutions of these auxiliaries.

9. The process according to claim 1, characterized in that the sulfur compound used in the second step is hydrogen sulfide ($H_2S$), or a compound capable of releasing hydrogen sulfide by hydrogenolysis.

10. The process according to claim 1, characterized in that, in the second step, the catalyst in a first stage is placed in contact with the sulfur compound, by depositing the latter on the surface of the catalyst, followed by a second stage, during which the catalyst is placed in contact with a gas containing hydrogen, under conditions such that the sulfur compound decomposes and gives rise to hydrogen sulfide.

11. The process according to claim 1, characterized in that the second step is performed by placing the catalyst in contact with a preconstituted sulfur-containing gaseous mixture, containing hydrogen and hydrogen sulfide.

12. The process according to claim 1, characterized in that the step of placing the catalyst in contact with the sulfur-containing gaseous mixture is performed at a temperature below 300° C.

13. The process according to claim 1, characterized in that:
(a) the catalyst comprises at least one metal selected from metals of Group VIII and VIB of the Periodic Table of the Elements, wherein said metal is deposited on a support made of one or more refractory mineral oxides, thereby to obtain the catalyst in oxide form; and
(b) the process is performed under conditions such that the sulfurized catalyst obtained by this process contains at least 1% by weight of carbon originating from the sulfurization auxiliary of formula (I), relative to the total weight of the catalyst in oxide form.

14. The process according to claim 13, characterized in that the sulfurized catalyst obtained by this process contains at least 1.5% by weight of carbon originating from the sulfurization auxiliary of formula (I), relative to the total weight of the catalyst in oxide form.

15. The process according to claim 1, characterized in that it comprises, after the said second step, a step of passivating the catalyst.

16. The process according to claim 1, characterized in that the step of placing the catalyst in contact with the sulfur-containing gaseous mixture is performed at a temperature below 275° C.

17. The process according to claim 1, characterized in that the step of placing the catalyst in contact with the sulfur-containing gaseous mixture is performed at a temperature below 250° C.

18. The process according to claim 1, characterized in that it comprises a step of oxidatively passivating the catalyst after the said second step.

* * * * *